(12) United States Patent
Choiniere et al.

(10) Patent No.: US 9,219,515 B2
(45) Date of Patent: Dec. 22, 2015

(54) PROTECTIVE FILM AND RELATED ASSEMBLY AND METHOD

(71) Applicant: Apple Inc., Cupertino, CA (US)

(72) Inventors: Paul Choiniere, Livermore, CA (US); Christopher D. Prest, San Francisco, CA (US); Dale N. Memering, San Francisco, CA (US); Matthew S. Rogers, San Jose, CA (US); Michael K. Pilliod, Venice, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 14/019,369

(22) Filed: Sep. 5, 2013

(65) Prior Publication Data

US 2015/0064422 A1    Mar. 5, 2015

(51) Int. Cl.
| | |
|---|---|
| *B32B 3/10* | (2006.01) |
| *H04B 1/3888* | (2015.01) |
| *B32B 38/10* | (2006.01) |
| *B32B 27/06* | (2006.01) |
| *B32B 27/28* | (2006.01) |
| *B32B 3/08* | (2006.01) |
| *B32B 37/24* | (2006.01) |
| *B32B 37/12* | (2006.01) |
| *H04M 1/02* | (2006.01) |
| *H04M 1/18* | (2006.01) |

(52) U.S. Cl.
CPC .............. *H04B 1/3888* (2013.01); *B32B 3/085* (2013.01); *B32B 3/10* (2013.01); *B32B 27/06* (2013.01); *B32B 27/281* (2013.01); *B32B 38/10* (2013.01); *B32B 37/12* (2013.01); *B32B 2037/243* (2013.01); *B32B 2037/246* (2013.01); *B32B 2307/412* (2013.01); *B32B 2307/558* (2013.01); *B32B 2457/20* (2013.01); *B32B 2571/00* (2013.01); *B32B 2605/006* (2013.01); *H04M 1/0266* (2013.01); *H04M 1/185* (2013.01); *Y10T 428/24802* (2015.01); *Y10T 428/24868* (2015.01)

(58) Field of Classification Search
None
See application file for complete search history.

(56) References Cited

U.S. PATENT DOCUMENTS

| | | | |
|---|---|---|---|
| 2012/0327568 A1 | 12/2012 | Shedletsky et al. | |
| 2013/0020229 A1* | 1/2013 | Wyner | 206/591 |
| 2013/0088779 A1 | 4/2013 | Kang et al. | |
| 2013/0115473 A1 | 5/2013 | Nakayama et al. | |
| 2013/0280463 A1* | 10/2013 | On et al. | 428/38 |
| 2014/0116329 A1† | 5/2014 | Chaudhari | |
| 2014/0322499 A1* | 10/2014 | Hsu | 428/195.1 |

* cited by examiner
† cited by third party

*Primary Examiner* — David Sample
*Assistant Examiner* — Christopher Polley
(74) *Attorney, Agent, or Firm* — Downey Brand LLP

(57) ABSTRACT

A protective film configured to protect a substrate such as a glass panel for a display is provided. The protective film may include a discontinuous outer layer including a multitude of panels and gaps positioned therebetween. Further, the protective film may include a flexible layer positioned between the discontinuous outer layer and the substrate. When panels of the discontinuous outer layer are impacted by a foreign object, the force may be transferred to the flexible layer, rather than propagating through the outer layer. In this regard, the gaps between the panels of the discontinuous outer layer may prevent the formation of cracks that may otherwise occur. Related assemblies and methods are also provided.

20 Claims, 13 Drawing Sheets

PROTECTIVE FILM AND RELATED ASSEMBLY AND METHOD

TECHNICAL FIELD

The present disclosure relates generally to protective films, and more particularly to protective films configured to protect a substrate and related assemblies and methods.

BACKGROUND

Computing devices typically employ a display to output graphics, text, and other visual information. Often the display is covered by a panel that protects the display from damage and contamination. In many devices the panel is formed from glass. Glass panels may be preferable in that they may substantially avoid interfering with a user's view of the display due to desirable optical properties thereof.

However, one issue with a glass panel is that it may be damaged under certain circumstances. For example, a drop event may cause a glass panel to shatter or crack. Similar issues may exist with other embodiments of substrates employed to protect a display. Films have been developed and employed to protect display panels from breakage in drop events. In this regard, such films may include a hard coating (e.g., a glass-like coating) configured to resist shattering of the display panel. These films may also be employed to protect other panels of glass that form housings for electronic devices, windows, or perform other functions. However, such films may not provide sufficient resistance to breakage and other damage in all circumstances.

Accordingly, improved films for protecting display panels or other substrates may be desirable.

SUMMARY

Embodiments of the present disclosure relate to protective films that may be attached to substrates such as glass panels to protect the glass panels from damage. The protective film may include multiple layers. For example, the protective film may include an outer layer and a flexible layer.

The outer layer may be discontinuous. In this regard, the outer layer may include multiple relatively small panels that are separated by gaps. Thus, by providing many individual panels, when the protective layer is subject to an impact from a sharp item, only the directly impacted panels may be damaged. The force from the impact may be absorbed by the flexible layer. Accordingly, damage from the impact may not propagate through the protective layer.

An intermediate discontinuous layer may also be provided for additional protection. Further, an adhesive layer may be employed to couple the protective film to the substrate. However, in other embodiments the flexible layer may be deposited directly on the substrate. Related assemblies and methods are also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Representative applications of assemblies, apparatuses, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described in detail below, the following relates to protective films configured to protect substrates from damage. It should be noted that the present description is generally provided in terms of protection of a substrate covering a display of an electronic device. However, the protective films employed herein may be employed with any substrate in accordance with embodiments of the disclosure. In this regard, the protective films may be employed with front, side, or back plates for electronic devices, substrates protecting laptop or television displays, automotive windows, building windows, and any other embodiment of substrate.

Figure 1:
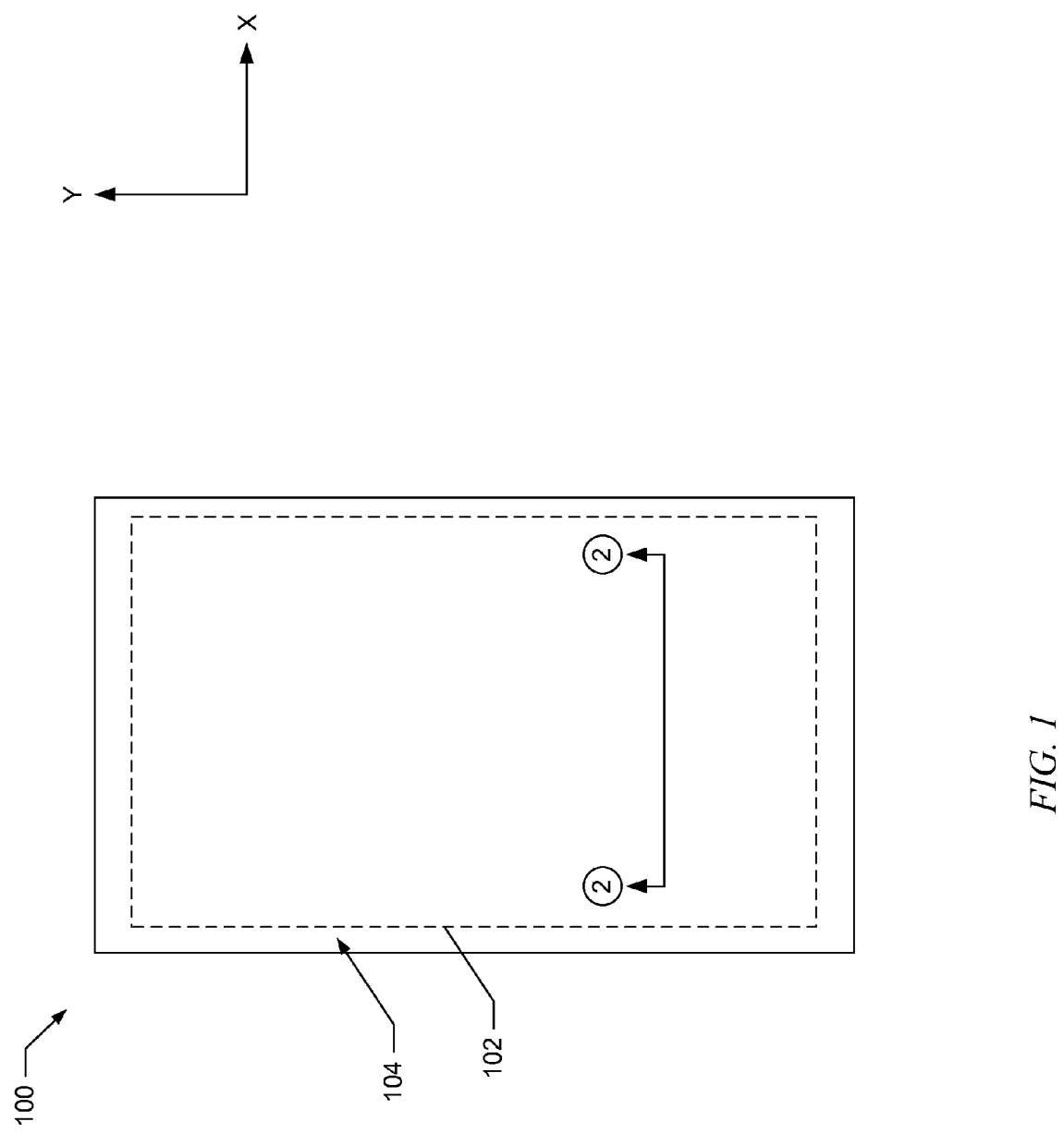
FIG. 1 illustrates a top view of an embodiment of a portable computing device including a display and a protective assembly according to an example embodiment of the present disclosure.

FIG. 1 illustrates an embodiment of a portable electronic device 100. For example, the portable electronic device 100 may comprise a smartphone. In this regard, due to the portable nature of such a device, impact events may frequently occur to user mishandling and accidents. As illustrated, the portable electronic device 100 may include a display 102 configured to display one or more graphical images and a protective assembly 104 positioned thereon and configured to cover and protect the display.

Figure 2:
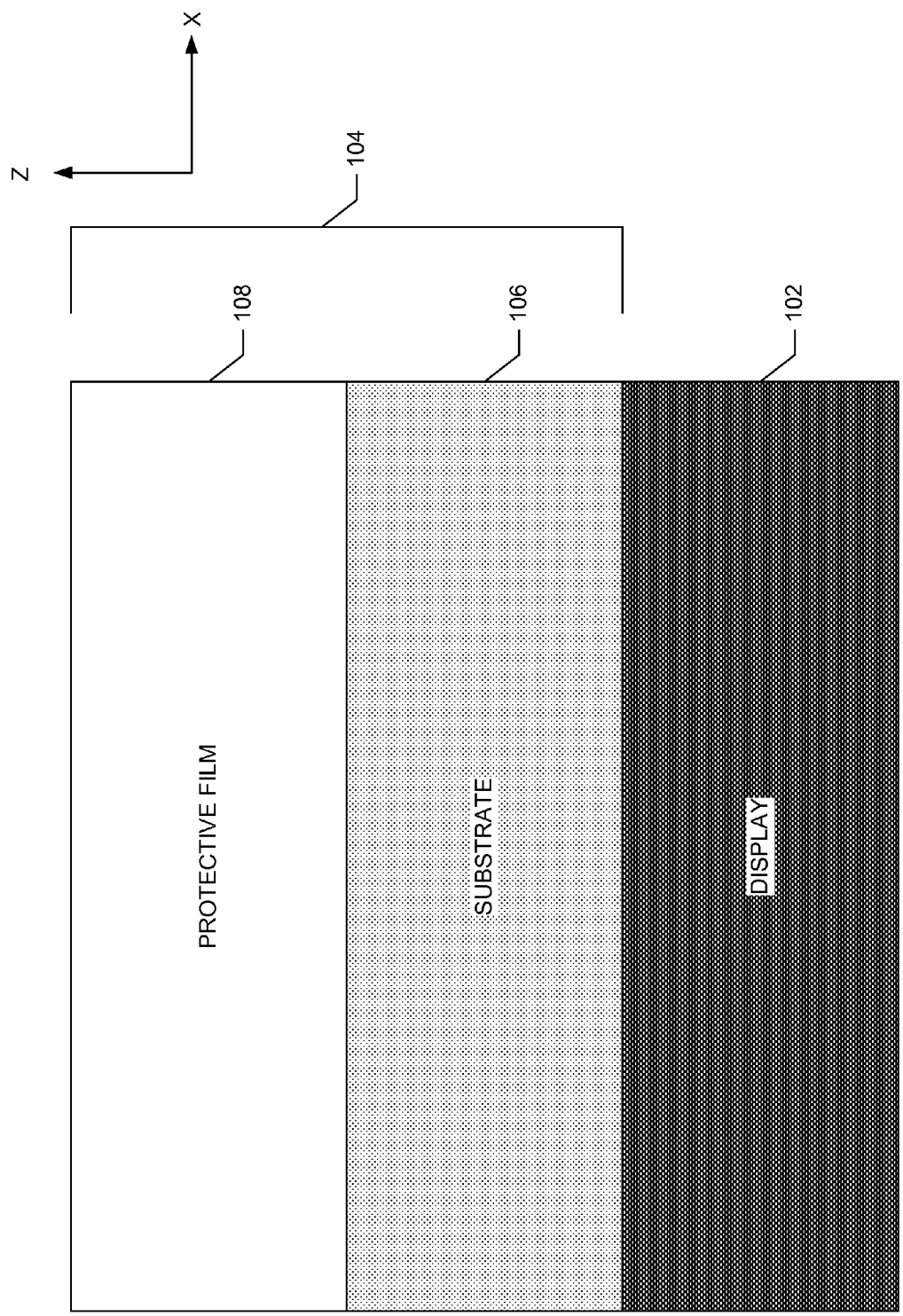
FIG. 2 illustrates a partial sectional view through the portable computing device of FIG. 1 along line 2-2 according to an example embodiment of the present disclosure.

FIG. 2 schematically illustrates a partial sectional view through the display 102 and the protective assembly 104 of the portable electronic device 100 along line 2-2 from FIG. 1. As illustrated, the protective assembly 104 may include a substrate 106 and a protective film 108. In one embodiment the substrate 106 may comprise a glass panel.

Use of a glass substrate may be preferable in some embodiments due to glass defining desirable optical properties. Note, however, that although the present disclosure generally describes usage of such films in conjunction with a glass substrate, the substrate may comprise various other substances in other embodiments (e.g., crystal, acrylic, plastic, etc.). Accordingly, it should be understood that reference to a glass substrate is for example purposes only, and the substrate may comprise various other materials in accordance with embodiments of the present disclosure.

The protective film 108 may be configured to protect the substrate 106. For example, the protective film 108 may be configured to protect the substrate 106 from damage such as cracks and scratches. In this regard, some materials employed as the substrate 106, such as glass, may be relatively brittle and otherwise prone to such damage when a hard and/or sharp object comes into contact therewith. Sharp objects, as used herein, refers to objects defining a surface area of about 2 square millimeters or less. In some embodiments each of the one or more layers of the protective film 108 may be at least partially transparent. Accordingly, the protective film 108 may be employed in conjunction with the display 102, without substantially detrimentally affecting the usability thereof.

Figure 3:
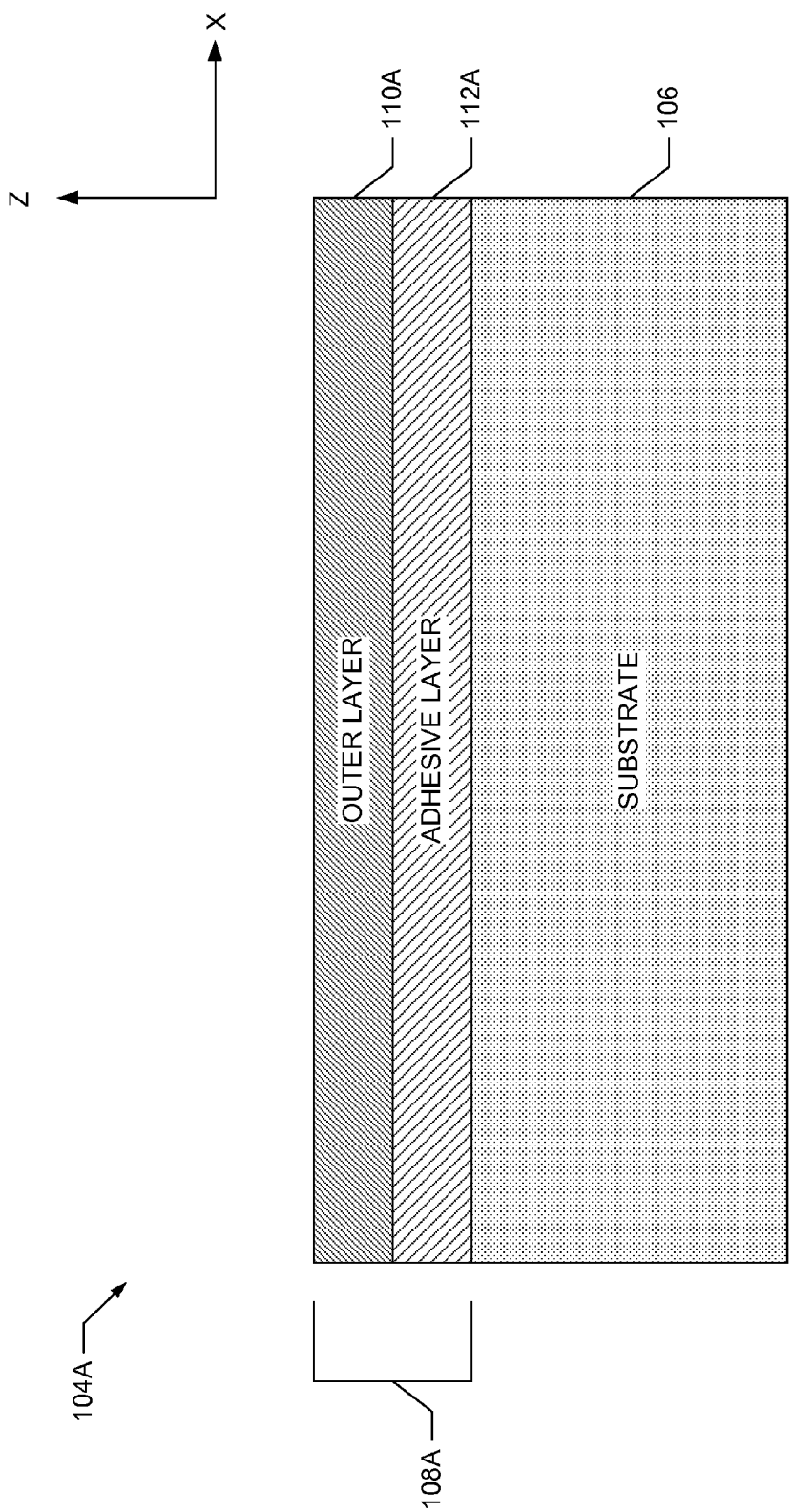
FIG. 3 illustrates a partial sectional view through the protective assembly of the portable computing device of FIG. 1 along line 2-2 and including a continuous outer layer according to an example embodiment of the present disclosure.

FIG. 3 illustrates a cross-sectional view through a first embodiment of the protective assembly 104A. As illustrated, in one embodiment the protective film 108A may include an outer layer 110A coupled to the substrate 106 via an adhesive layer 112A. The adhesive layer 112A may be configured to bond to the layers in immediate contact therewith (e.g., the substrate 106 and the outer layer 110A in the embodiment illustrated in FIG. 3).

The outer layer 110A may comprise a hard coating in some embodiments. A hard coating refers to material defining relatively high hardness that is configured to resist scratches, cracks, and/or other damage. In this regard, in one embodiment the outer layer 110A may comprise an alumina material, a nitride material, a sapphire material, a diamond-like material or a ceramic.

However, an issue with respect to hard coatings defining an outer layer is that in instances in which they crack, the crack may spread throughout a substantial portion of the layer. For example, when a relatively sharp and hard object impacts the outer layer 110A, despite the layer defining a relatively hard material, cracks may form. Due to propagation of the cracks through the outer layer 110A, it may be relatively hard to view the display 102 thereunder after the impact event. Such cracks may also form as a result of a bending moment being applied to the portable electronic device 100. Regardless of the cause of the damage, the propagated cracks in the outer layer 110A may substantially impair the usability of the portable electronic device 100.

Figure 4:
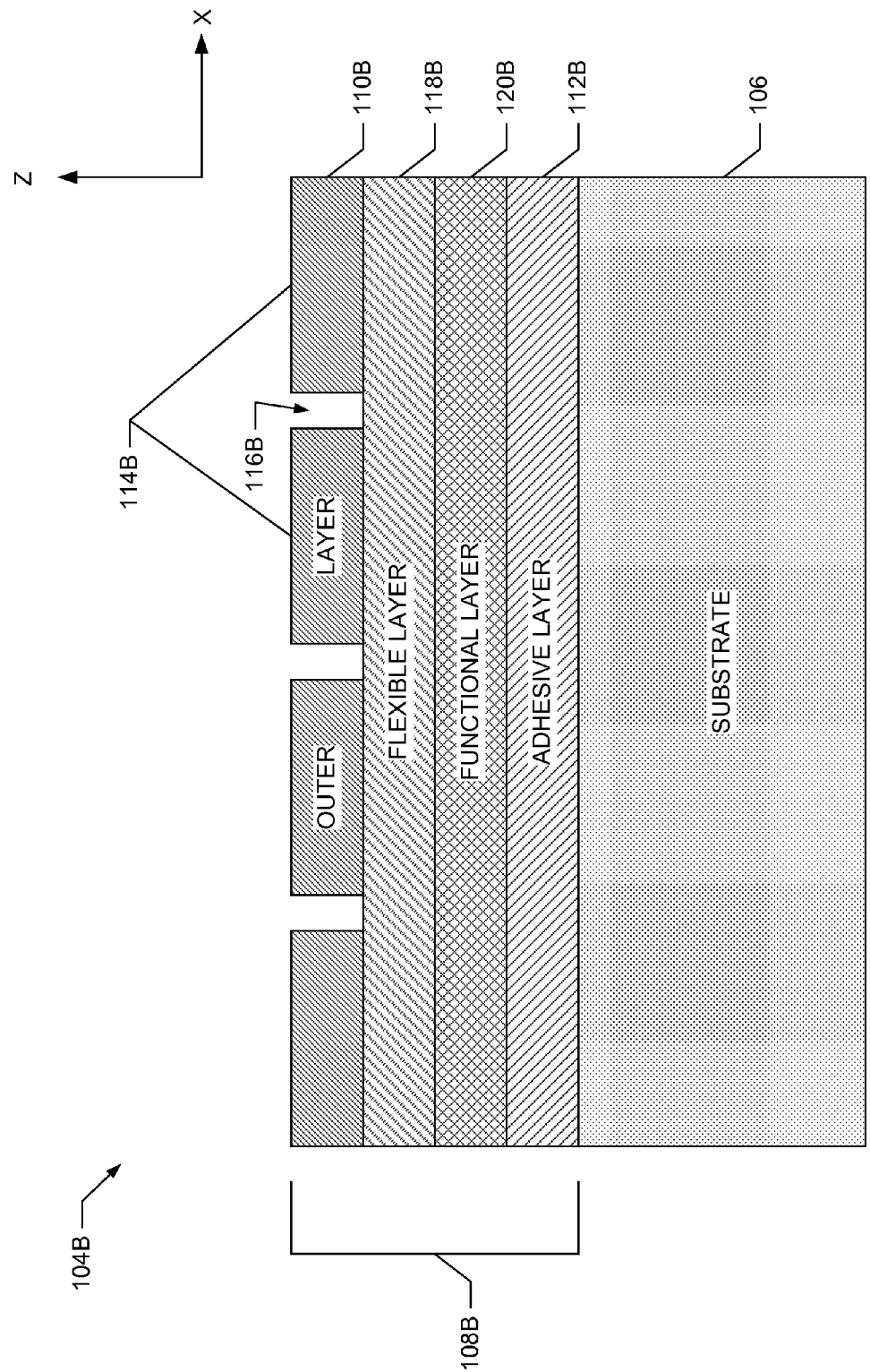
FIG. 4 illustrates a partial sectional view through the protective assembly of the portable computing device of FIG. 1 along line 2-2 and including a discontinuous outer layer according to an example embodiment of the present disclosure.

Accordingly, FIG. 4 illustrates an alternate embodiment of the protective assembly 104B. As illustrated, the protective film 108B may include an adhesive layer 112B coupled to the substrate 106, as discussed above. Further, the protective film 108B may include an outer layer 110B. However, whereas the outer layer 110A included in the embodiment of the protective assembly 104A illustrated in FIG. 3 was substantially continuous across the surface of the substrate 106, the outer layer 110B included in the protective assembly 104B illustrated in FIG. 4 may be discontinuous. In this regard, the outer layer 110B included in the protective assembly 104B of FIG. 4 may comprise a plurality of panels 114B separated by gaps 116B.

Figure 5:
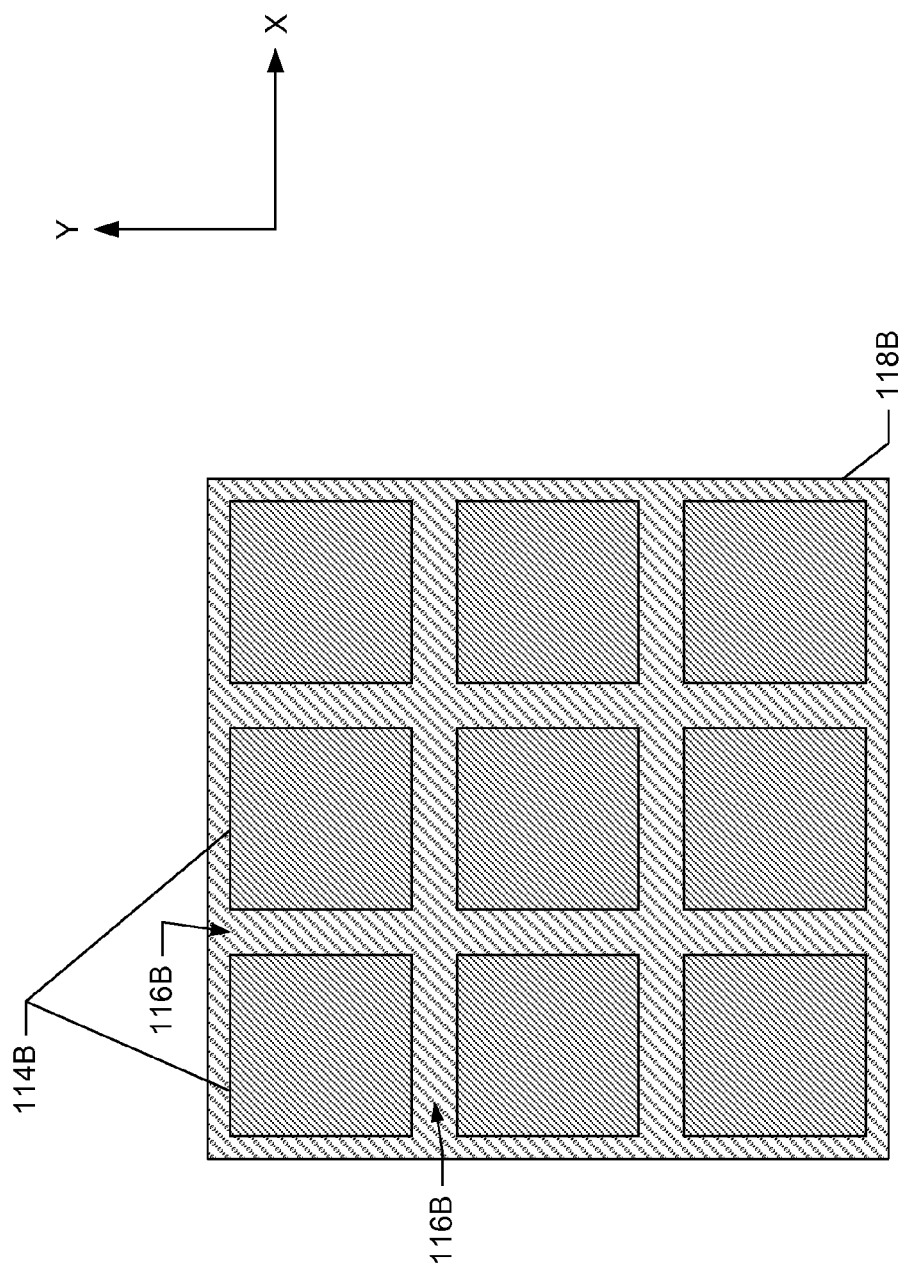
FIG. 5 illustrates an enlarged top view of the discontinuous outer layer of FIG. 4 including square panels according to an example embodiment of the present disclosure.
Figure 6:
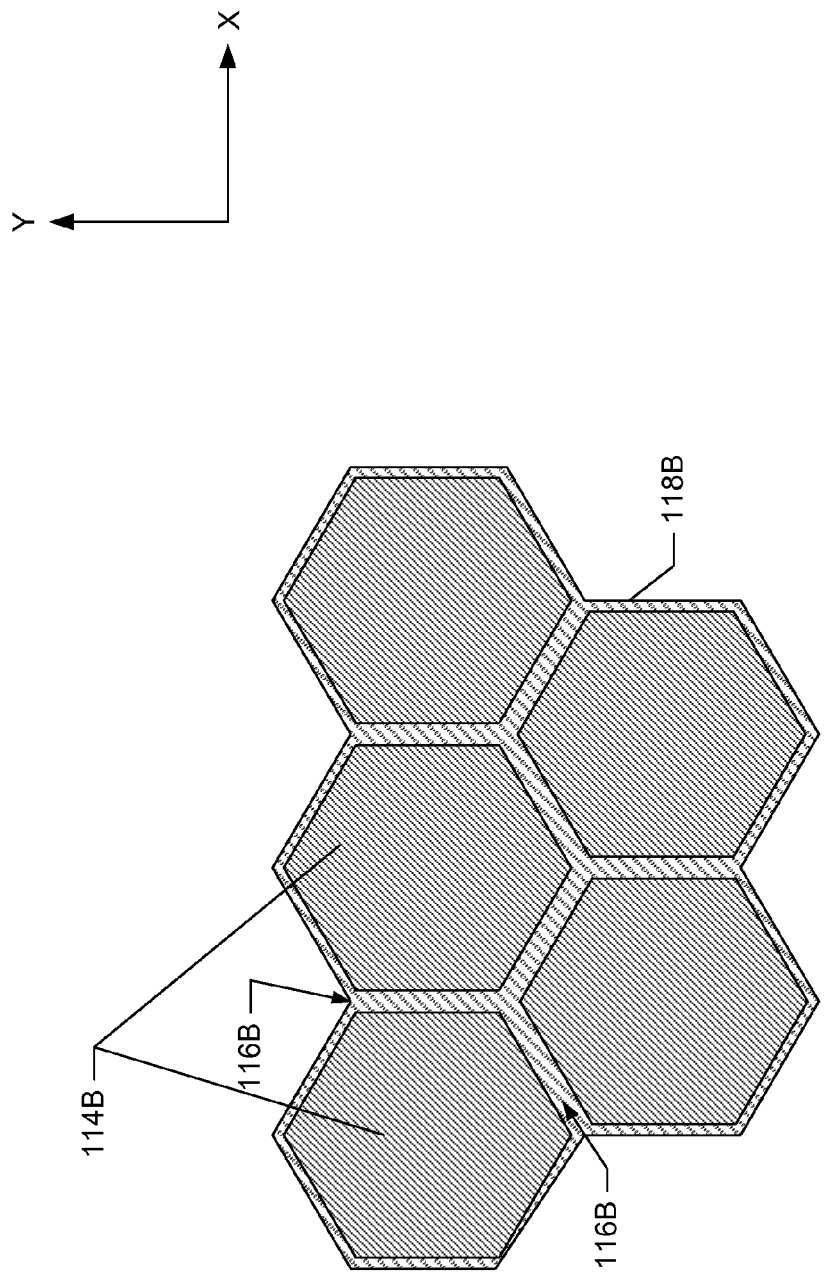
FIG. 6 illustrates an enlarged top view of the discontinuous outer layer of FIG. 4 including hexagonal panels according to an example embodiment of the present disclosure.

For example, FIG. 5 illustrates a top view of a portion of the protective film 108B. As illustrated, in some embodiments the panels 114B may comprise a plurality of squares arranged in a regular pattern with the gaps 116B positioned therebetween. By way of further example, FIG. 6 illustrates a top view of a portion of the discontinuous outer layer 110B in an embodiment in which the panels 114B comprise a plurality of hexagons arranged in a regular pattern with the gaps 116B positioned therebetween.

In one embodiment the panels 114B may define a height (along the X-axis in FIGS. 5 and 6) and a width (along the Y-axis in FIGS. 5 and 6) from about 20 micrometers to about 500 micrometers. Further, the gaps 116B between two adjacent panels 114B may be from about 50 nanometers to about 5 micrometers. Accordingly, the panels 114B may define width and/or height dimensions that are larger than the gaps 116B (e.g., from about 4 to about 10,000 times larger than a width of the gaps between adjacent panels). In this regard, use of relatively small gaps may resist or prevent objects from extending between the panels and causing damage to underlying components and layers.

The panels of the discontinuous outer layer may define various other regular or irregular patterns, shapes, and sizes in other embodiments. Further, in some embodiments the panels of a discontinuous outer layer may define a plurality of differing sizes and/or shapes. Use of differing sizes and/or shapes may reduce the length of straight line gaps in the outer panel, thereby reducing the potential for the panels and/or gaps to be visible to the naked eye. Further, reduction in the length of straight gaps may reduce the tendency or ability of an object to enter into the gaps.

As illustrated in FIG. 4, the discontinuous outer layer 110B may be coupled to a flexible layer 118B. The flexible layer 118B may be positioned immediately under the discontinuous outer layer 110B in some embodiments, as illustrated in FIGS. 4-6. Further, the flexible layer 118B may be directly or indirectly coupled to the adhesive layer 112B. In this regard, the flexible layer 118B may be positioned directly or indirectly between the outer layer 110B and the adhesive layer 112B.

The flexible layer 118B may comprise a polymer material in some embodiments. More particularly, in some embodiments the flexible layer 118B may comprise a polyimide such as OPTINOX film, as sold by NeXolve Corp. of Huntsville, Ala. However, the flexible layer 118B may comprise various other embodiments of flexible or ductile materials.

Figure 7:
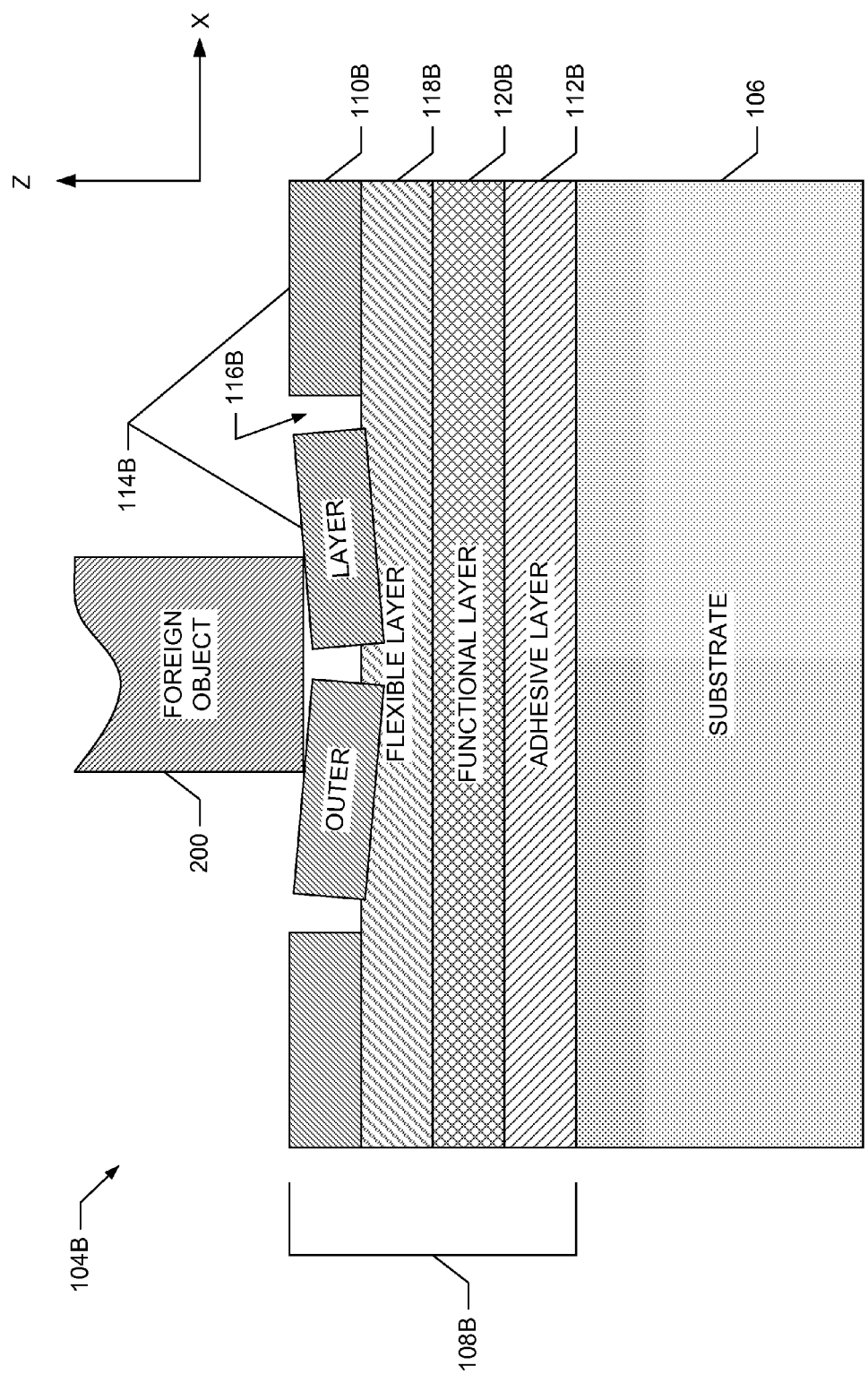
FIG. 7 illustrates a foreign object impacting the protective assembly of FIG. 4.

The panels 114B of the discontinuous outer layer 110B may be substantially rigid and hard. In this regard, use of substantially rigid and hard materials at the discontinuous outer layer 110B may define a protective outer surface that protects the substrate 106. Thus, as illustrated in FIG. 7, when a foreign object 200 impacts one or more of the panels 114B, the panels may substantially retain their shape.

However, the flexible layer 118B may deflect to dissipate the impact energy and prevent the panels 114B from damaging the substrate 106. In this regard, stress imparted to the protective film 108B may be spread out through the flexible layer 118B and be absorbed. The substrate 106 may support the protective film 108B during such an impact, since the panels 114B are disconnected from one another and the flexible layer 118B flexes.

Further, use of the discontinuous outer layer 110B may also provide benefits in terms of resistance to damage associated with bending moments. In this regard, bending moments applied to cover assemblies including a hard continuous outer layer may tend to cause fractures. However, use of a protective assembly 104B including disconnected panels 114B may prevent the buildup of stress in the outer layer 110B, such that fracturing does not occur.

Further, to the extent the panels 114B are damaged from impact or other event, such damage remains localized to a relatively small area. In this regard, by forming the outer layer 110B from independent panels 114B, damage to the outer layer may not propagate through the outer layer. Rather, only the individual panel 114B or cluster of panels actually impacted by the foreign object 200 may be affected.

Accordingly, in embodiments of the protective film with a discontinuous outer layer employed in devices including the display 102, a user may still be able to view the remaining portion of the display not directly overlapping with the impact area, and thus the display may remain largely viewable and useable. In contrast, in protective films employing a continuous outer layer, damage (e.g., cracks) may propagate through the outer layer, thus further reducing the usability of a display thereunder, in embodiments employed with a display. Accordingly, the discontinuous outer layer provided herein may avoid issues with respect to localized impacts or bending moments causing extensive damage to the protective film.

As illustrated in FIG. 4, the protective film may further comprise a performance or functional layer 120B positioned between the flexible layer 118B and the substrate 106. The functional layer 120B may be configured to enhance the functionality of the protective film 108B. For example, the functional layer 120B may comprise an infrared reflective layer configured to reflect infrared radiation and prevent it from traveling through the substrate 106 and heating components behind the substrate. In another embodiment the functional layer 120B may comprise an anti-reflective layer configured to reduce reflections and glare associated with viewing through the protective assembly 104B and the substrate 106. Various other functional layers, provided alone or in combination, may be employed.

Note that in existing applications functional layers included with substrates may typically be applied to the inner or outer surfaces of the substrate. In embodiments in which the functional layer is applied to the outer surface of the substrate, no protective layer is typically employed. Accordingly, embodiments of the protective films of the present disclosure may provide benefits in terms of protecting the functional layer by placing the outer layer and the flexible layer thereon. Further, by placing the functional layer outside of the substrate, the functionality thereof may be improved. For example, the substrate may itself be heated by infrared radiation when an infrared reflective layer is placed on an inside surface of the substrate, as opposed to an outside surface as disclosed herein.

Figure 8:
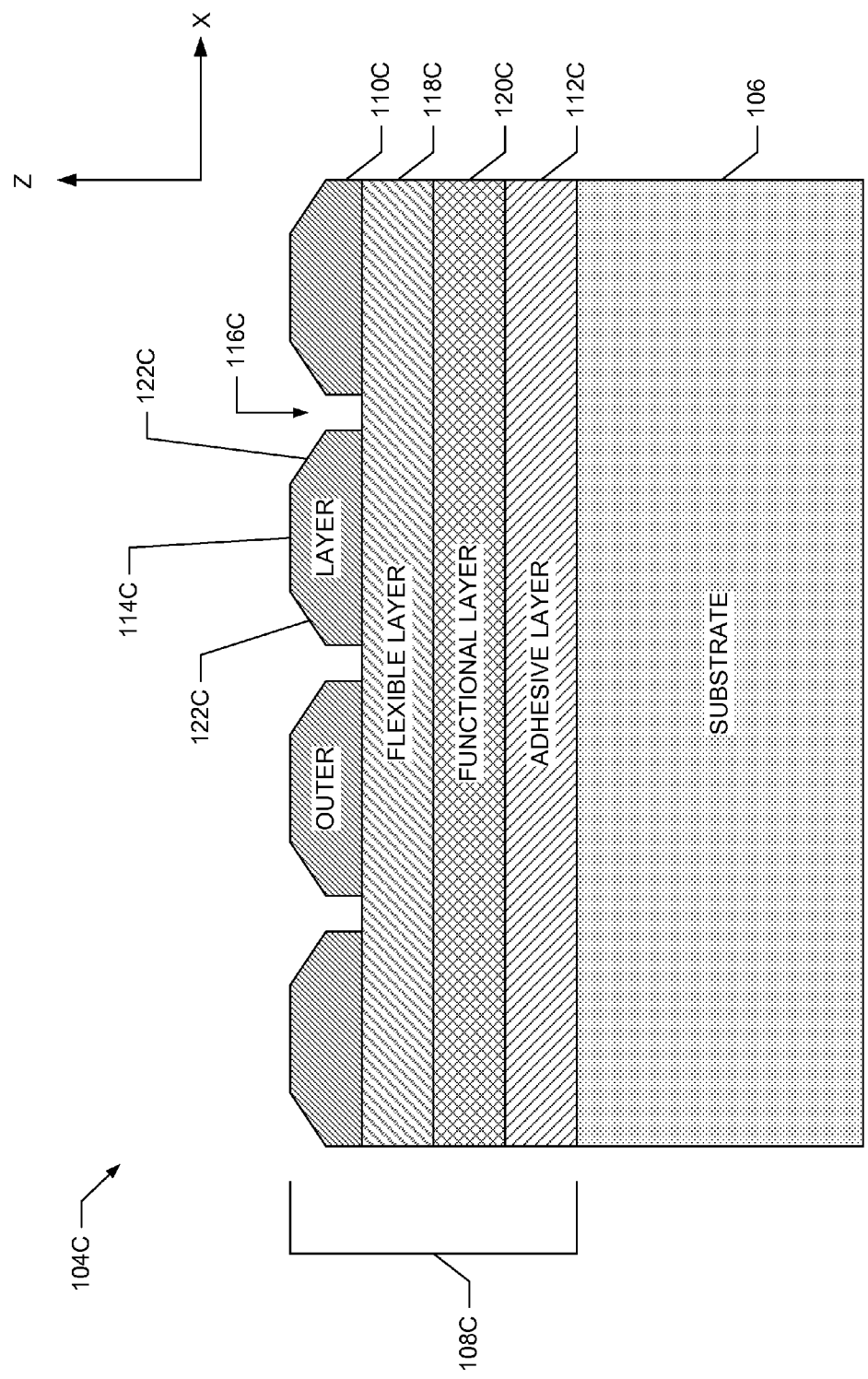
FIG. 8 illustrates a partial sectional view through the portable computing device of FIG. 1 along line 2-2 and including a discontinuous outer layer including panels with chamfered edges according to an example embodiment of the present disclosure.

FIG. 8 illustrates an alternate embodiment of the protective assembly 104C. As illustrated, the protective assembly 104C may include the substrate 106 and a protective film 108C. The protective film 108C may include an adhesive layer 112C, a functional layer 120C, a flexible layer 118C and a discontinuous outer layer 110C comprising panels 114C separated by gaps 116C. However, the protective assembly 104C may differ from previously-described embodiments in that the panels 114C may respectively define one or more chamfered edges 122C. The chamfered edges 122C may be configured to reduce snagging of the panels 114C when the protective film 108C is subjected to abrasion or rubbing. Note that chamfered edges, as used herein in reference to the panels 114C, includes any embodiment of edges wherein the material thickness (see, e.g., the Z-axis direction in FIG. 8) is lesser proximate the edges thereof. Thus, for example, chamfered edges may include rounded edges. Further, note that the chamfered edges may be included in any of the embodiments of protective films disclosed herein.

Figure 9:
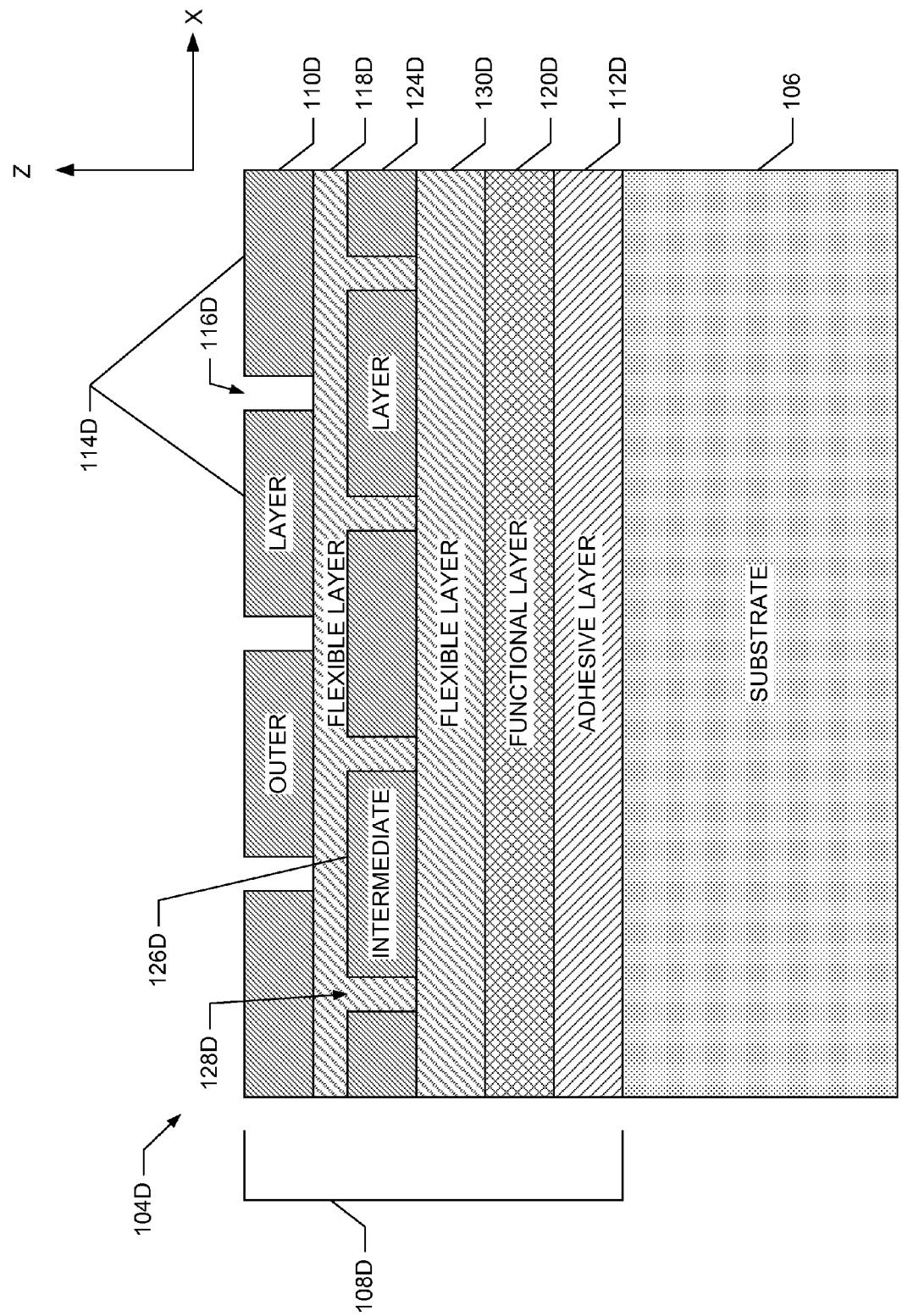
FIG. 9 illustrates a partial sectional view through the portable computing device of FIG. 1 along line 2-2 and including a discontinuous outer layer and a discontinuous intermediate layer according to an example embodiment of the present disclosure.

FIG. 9 illustrates an additional embodiment of the protective assembly 104D. As illustrated, the protective assembly 104D may include the substrate 106 and a protective film 108D. The protective film 108D may include an adhesive layer 112D, a functional layer 120D, a flexible layer 118D and a discontinuous outer layer 110D comprising panels 114D separated by gaps 116D. However, the protective assembly 104D may differ from previously-described embodiments in that the protective film 108D may further comprise a discontinuous intermediate layer 124D comprising a second plurality of panels 126D separated by a second plurality of gaps 128D. The discontinuous intermediate layer 124D may be positioned between the discontinuous outer layer 110D and the adhesive layer 112D.

Additionally, a second flexible layer 130D may be provided between the substrate 106 and the flexible layer 118D. In this regard, the discontinuous intermediate layer 124D may be deposited on the second flexible layer 130D and the flexible layer 118D may be deposited on the panels 126D and/or in the gaps 128D between the panels of the discontinuous intermediate layer 124D. Thus, as illustrated in FIG. 9, in some embodiments the flexible layer 118D may at least partially surround the discontinuous intermediate layer 124D. Further, the discontinuous outer layer 110D may be positioned on the flexible layer 118D.

Use of the discontinuous intermediate layer 124D in addition to the discontinuous outer layer 110D may provide certain benefits. In this regard, embodiments of the protective film including only one discontinuous layer (see, e.g., the discontinuous outer layer 110B illustrated in FIG. 4) include gaps between the panels. In order to avoid issues with respect to objects penetrating the protective film between the panels, the size of the gaps may be minimized and the packing density of the panels may be maximized. Further, the shapes of the panels may be selected such that the gaps are minimized. For example, use of circular panels may produce relatively large gaps therebetween, so they may not be used in some embodiments. Rather, adjacent panels may define matching perimeter shapes in some embodiments. However, regardless of the how small the gaps are, the potential for penetration through the gaps may exist. Accordingly, the discontinuous intermediate layer 124D may be configured such that the panels 126D thereof overlap with the gaps 116D of the discontinuous outer layer 110D. Thus, in the event that an object manages to extend through a gap 116D in the discontinuous outer layer 110D, a panel 126D of the discontinuous intermediate layer 124D may prevent further penetration through the protective film 108C.

Figure 10:
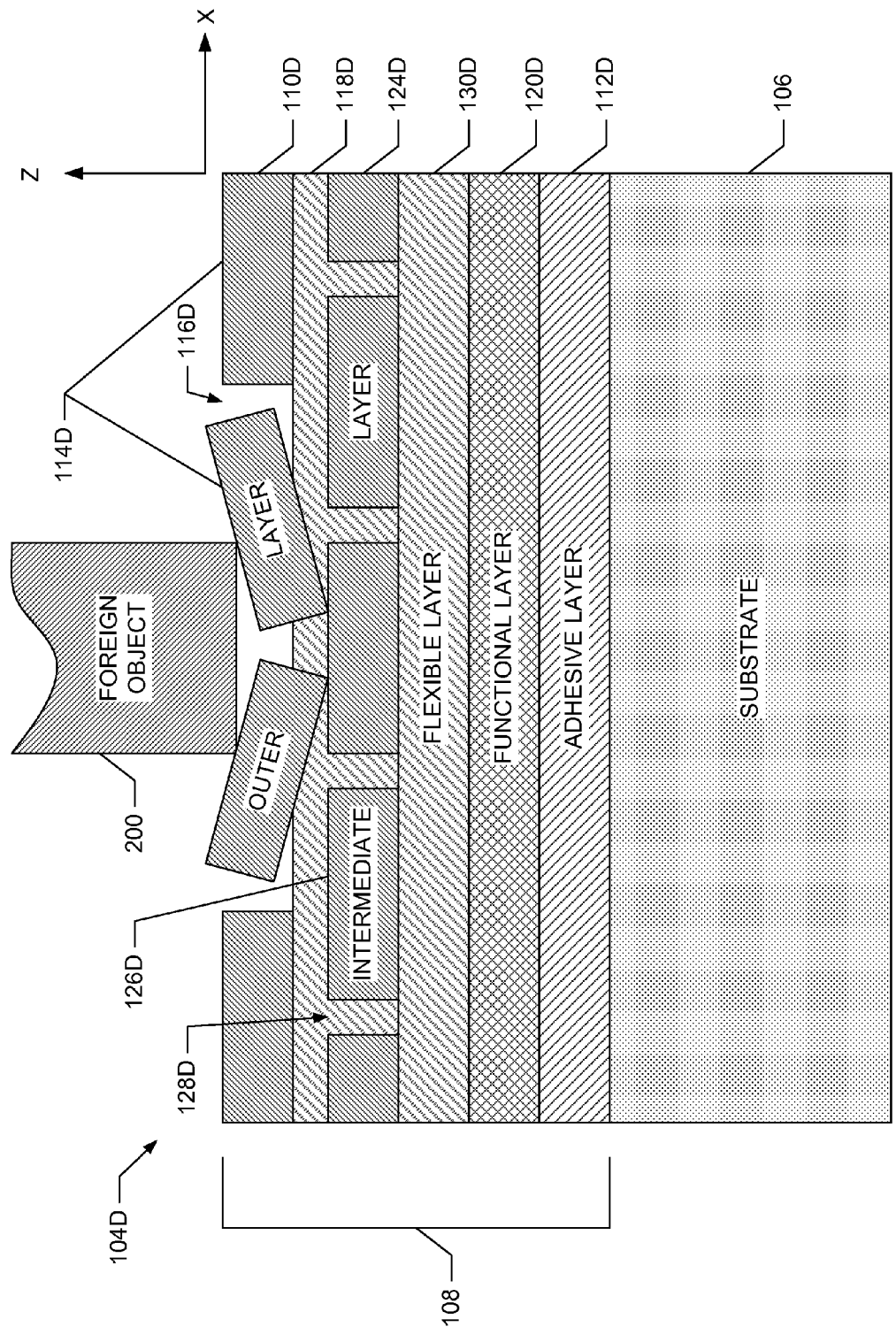
FIG. 10 illustrates a foreign object impacting the protective assembly of FIG. 9.

Further, in the event that the outer layer 110D is subject to a relatively severe impact, the discontinuous intermediate layer 124D may lessen the chance of the impact damaging the substrate 106. More particular, as illustrated in FIG. 10, in the event that the discontinuous outer layer 110D is subject to a relatively sever impact from a foreign object 200, one or more of the panels 114D may severely deflect toward the substrate 106. However, due to the positioning of the discontinuous intermediate layer 124D between the discontinuous outer layer 110D and the substrate 106, the panels 126D of the discontinuous intermediate layer may prevent the panels 114D of the discontinuous outer layer from damaging the substrate.

Figure 11:
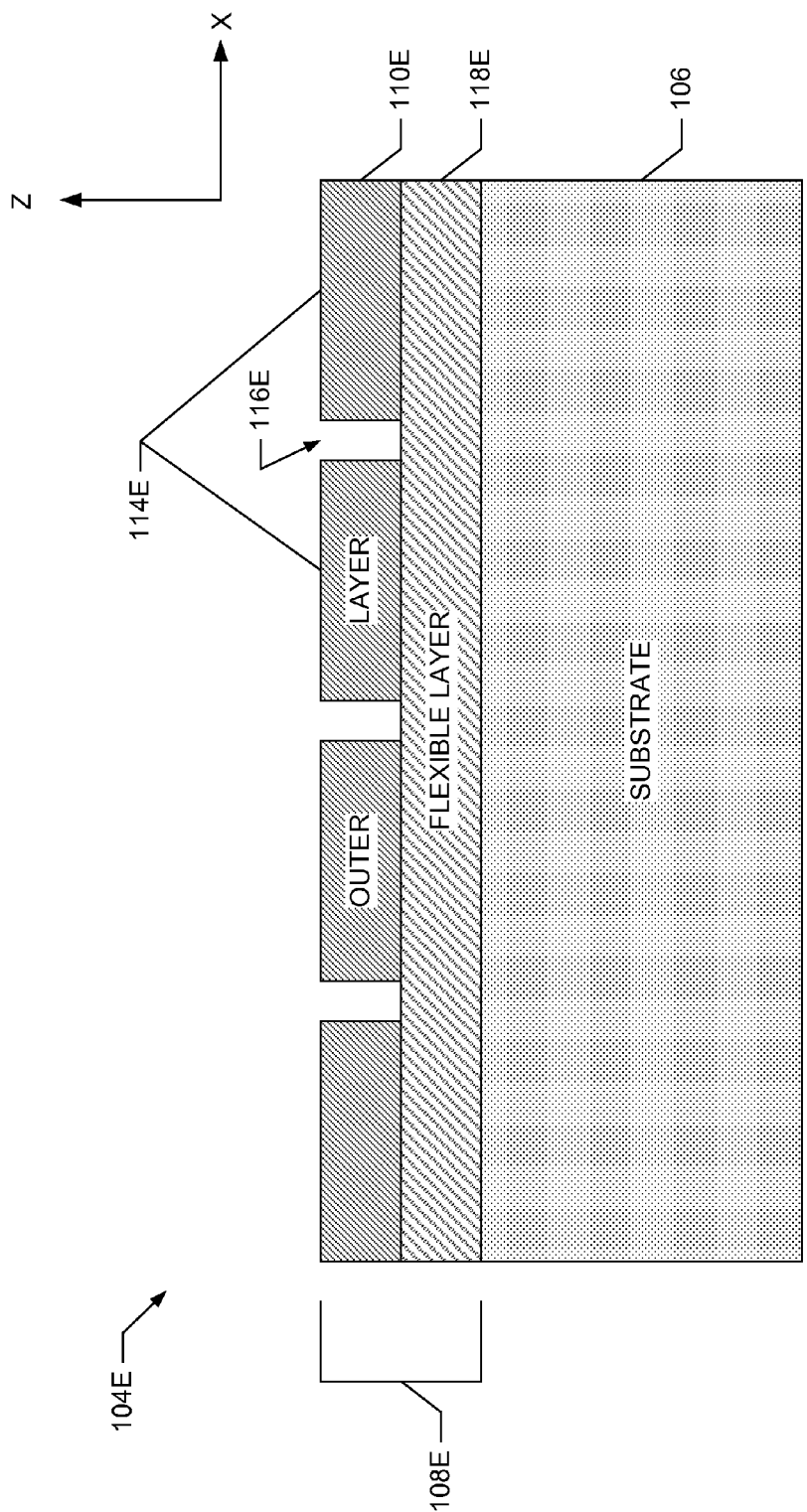
FIG. 11 illustrates a partial sectional view through the portable computing device of FIG. 1 along line 2-2 excluding an adhesive layer according to an example embodiment of the present disclosure.

FIG. 11 illustrates an additional embodiment of a protective assembly 104E. As illustrated, the protective assembly 104E may include the substrate 106 and a protective film 108E. The protective film 108E may include a flexible layer 118E and a discontinuous outer layer 110E comprising a plurality of panels 114E separated by gaps 116E. However, as illustrated, the protective film 108E may not include an adhesive layer. Rather, the flexible layer 118E may be directly deposited on the substrate 106 in some embodiments.

Note that although the embodiments of the protective film are generally described herein as being separate, the embodiments may be combined in any of various manners. For example, the panels 114E of the protective film 108E illustrated in FIG. 11 may include chamfered edges, the protective film may additionally include a functional layer, and/or the protective film may additionally include an intermediate discontinuous layer. All other combinations of the embodiments disclosed herein are also provided.

As noted above, in some embodiments each of the layers of the protective film may be substantially transparent. However, in other embodiments of the present disclosure certain ones of the layers of the protective film may not be transparent. For example, some embodiments of the discontinuous outer coating disclosed herein may not be transparent. Thus, in some embodiments such layers may cover only a portion of the substrate. For example, in embodiments of the portable electronic device 100 in which the substrate 106 defines a front plate thereof, layers that are opaque or otherwise optically detrimental may be selectively positioned such that they do not block the display 102. For example, such layers may extend around the perimeter of the display to provide extra protection to the front panel substrate at the corners and edges of the portable electronic device 100.

The overall thickness (see, e.g., the Z-axis in FIG. 4) of the protective film may be minimized in accordance with embodiments of the present disclosure. For example, in one embodiment the overall thickness of the protective film may be from about 5 micrometers to 100 micrometers when used on substrates for electronic devices. In some embodiments the discontinuous outer layer and the flexible layer may each respectively define a thickness from about 2 to 3 micrometers In other contexts, such as automotive or building windows, the protective film may define a thickness up to about 1.5 millimeters in order to provide additional impact resistance and damage resistance. Use of a thin protective film may cause the protective film to not behave in an independent fashion relative to the glass substrate. Rather, the protective film may substantially function as if it is a portion of the substrate. In this regard, a user may not be able to pick at an edge of it to remove it from the substrate. Further, the protective film may not be visible at edges of the substrate. Accordingly, the cosmetic appearance of the device employing the protective film may be improved.

Figure 12:
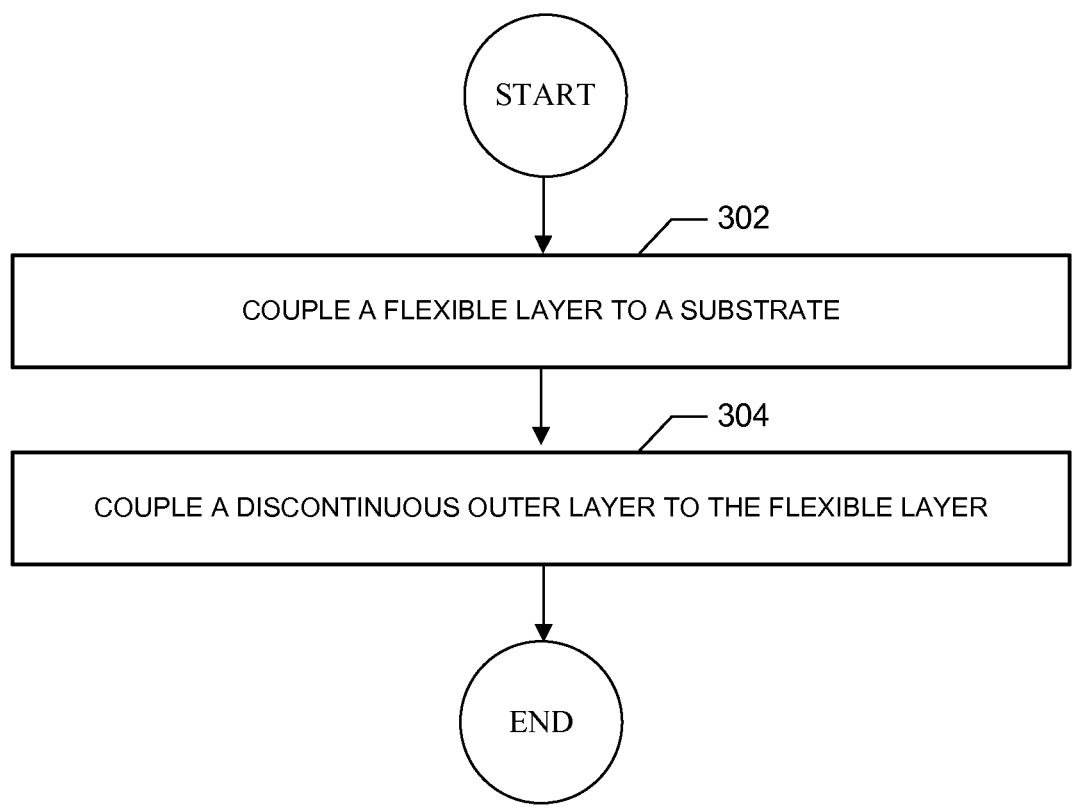
FIG. 12 schematically illustrates a method for forming a protective assembly according to an example embodiment of the present disclosure.

A related method for forming a protective assembly is also provided. As illustrated in FIG. 12, the method may include coupling a flexible layer to a substrate at operation 302. Further, the method may include coupling a discontinuous outer layer to the flexible layer at operation 304. The discontinuous outer layer may comprise a plurality of panels separated by a plurality of gaps.

In some embodiments coupling the discontinuous outer layer to the flexible layer at operation 304 may comprise applying a continuous outer layer and removing a portion of the continuous outer layer to define the gaps. For example, the flexible layer may be deposited by ion beam assisted deposition (IBAD) via physical vapor deposition (PVD) (e.g., roll-to-toll ion assisted PVD) in some embodiments. By way of further example, a roll of the flexible layer may be directed through a deposition chamber at which the outer layer is deposited thereon. However, various other example embodiments of methods for depositing the outer layer may include PVD, sputtering, and liquid (e.g., spray) application. Thereafter, removing the portion of the continuous outer layer to define the gaps may comprise at least one of laser ablating and etching (e.g., chemical or plasma etching) the continuous outer layer.

In another embodiment coupling the discontinuous outer layer to the flexible layer at operation 304 may comprise depositing a material at a plurality of discrete locations on the flexible layer. Further, depositing the material may comprise at least one of IBAD via PVD (e.g., roll-to-toll ion assisted PVD), PVD, sputtering, and liquid application. In some embodiments the material may be deposited in a discontinuous manner via masking (e.g., photolithography masking).

Further, coupling the flexible layer to the substrate at operation 302 may comprise applying an adhesive to the flexible layer and the substrate. In another embodiment coupling the flexible layer to the substrate at operation 302 may comprise depositing the flexible layer directly on the substrate.

The remaining layers, including the adhesive layer, the functional layer, the flexible layer(s), and the discontinuous intermediate layer may also be applied via one or more of IBAD via PVD (e.g., roll-to-toll ion assisted PVD), PVD, sputtering, and liquid application in some embodiments. Additionally, in some embodiments the protective film may be manufactured and then applied as a sheet to the substrate using the adhesive layer.

Figure 13:
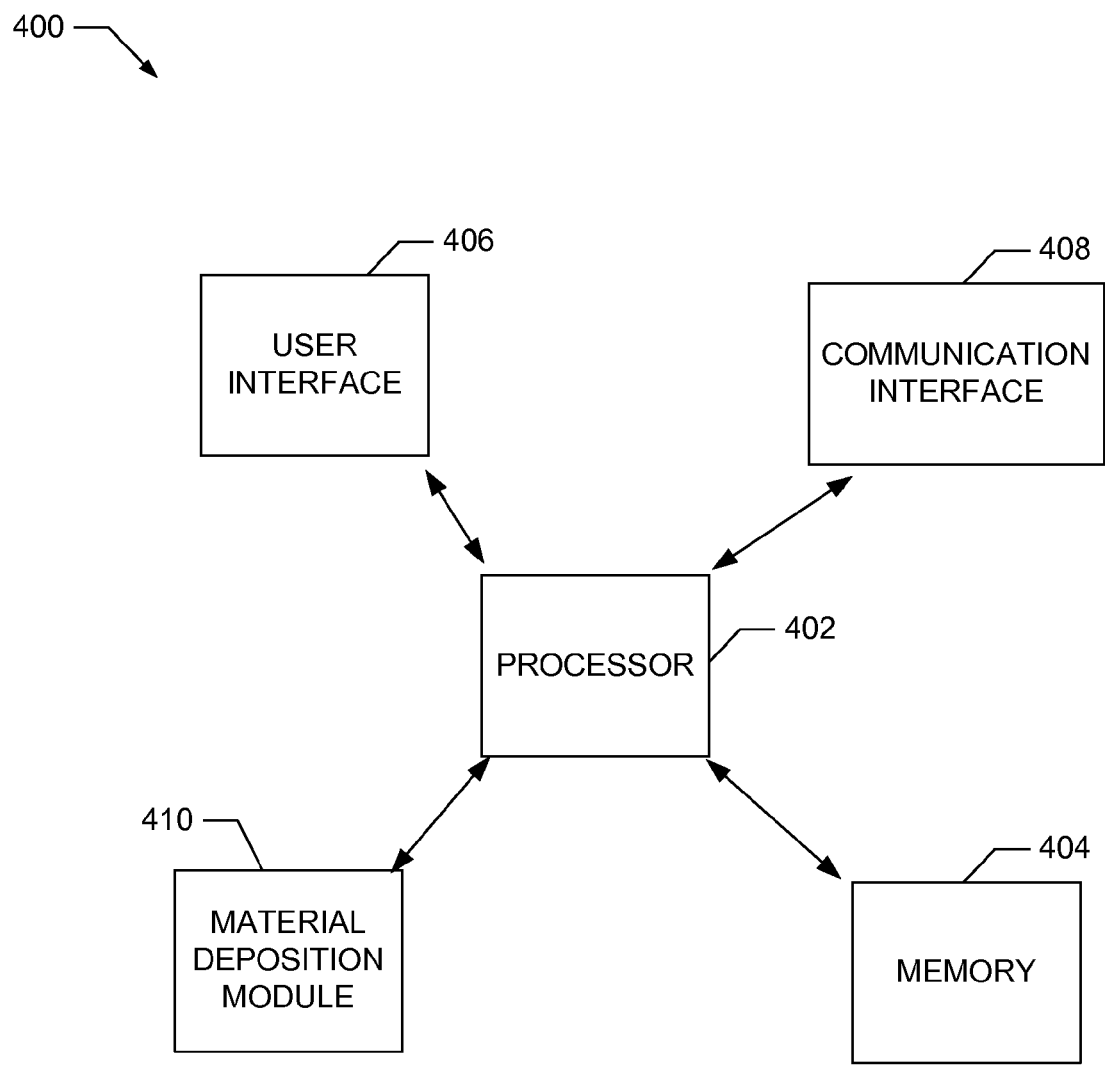
FIG. 13 schematically illustrates a block diagram of an electronic device according to an example embodiment of the present disclosure.

FIG. 13 is a block diagram of an electronic device 400 suitable for use with the described embodiments. In one example embodiment the electronic device 400 may be embodied in or as a controller configured for controlling operations performed in depositing layers of the protective film as described herein. In this regard, depositing layers may include depositing material in a discontinuous manner or continuously depositing material and thereafter removing material in the context of the discontinuous layers provided herein.

The electronic device 400 illustrates circuitry of a representative computing device. The electronic device 400 may include a processor 402 that may be microprocessor or controller for controlling the overall operation of the electronic device 400. In one embodiment the processor 402 may be particularly configured to perform the functions described herein relating to deposition of layers of the protective film. The electronic device 400 may also include a memory device

404. The memory device 404 may include non-transitory and tangible memory that may be, for example, volatile and/or non-volatile memory. The memory device 404 may be configured to store information, data, files, applications, instructions or the like. For example, the memory device 404 could be configured to buffer input data for processing by the processor 402. Additionally or alternatively, the memory device 404 may be configured to store instructions for execution by the processor 402.

The electronic device 400 may also include a user interface 406 that allows a user of the electronic device 400 to interact with the electronic device. For example, the user interface 406 can take a variety of forms, such as a button, keypad, dial, touch screen, audio input interface, visual/image capture input interface, input in the form of sensor data, etc. Still further, the user interface 406 may be configured to output information to the user through a display, speaker, or other output device. A communication interface 408 may provide for transmitting and receiving data through, for example, a wired or wireless network such as a local area network (LAN), a metropolitan area network (MAN), and/or a wide area network (WAN), for example, the Internet.

The electronic device 400 may also include a material deposition module 410. The processor 402 may be embodied as, include or otherwise control the material deposition module 410. The material deposition module 410 may be configured for controlling or executing material deposition operations as discussed herein including, for example, depositing material in a discontinuous manner or continuously depositing material and thereafter removing material in the context of the discontinuous layers provided herein. Further, the material deposition module may be configured for controlling or executing material deposition operations for the various other layers of the protective films provided herein.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A protective film, comprising:
    an adhesive layer configured to engage a substrate;
    a flexible layer coupled to the adhesive layer; and
    a discontinuous outer layer coupled to the flexible layer, the discontinuous outer layer comprising a plurality of panels separated by a plurality of gaps,
    wherein the discontinuous outer layer, the flexible layer, and the adhesive layer are transparent.

2. The protective film of claim 1, further comprising a functional layer positioned between the flexible layer and the adhesive layer.

3. The protective film of claim 2, wherein the functional layer comprises at least one of an infrared reflective layer and an anti-reflective layer.

4. The protective film of claim 1, wherein the panels of the discontinuous outer layer are rigid.

5. The protective film of claim 1, wherein the panels respectively define one or more chamfered edges.

6. The protective film of claim 1, further comprising a discontinuous intermediate layer comprising a second plurality of panels separated by a second plurality of gaps, the discontinuous intermediate layer being positioned between the discontinuous outer layer and the adhesive layer.

7. The protective film of claim 6, wherein the flexible layer at least partially surrounds the discontinuous intermediate layer.

8. An electronic assembly having a display that includes a protective film, comprising:
    a substrate;
    an adhesive layer engaging the substrate;
    a flexible layer coupled to the adhesive layer; and
    a discontinuous outer layer coupled to the flexible layer, the discontinuous outer layer comprising a plurality of panels separated by a plurality of gaps, wherein the discontinuous outer layer, the flexible layer, and the adhesive layer are transparent.

9. The electronic assembly of claim 8, wherein the plurality of panels have a distribution and a shape at a location in accordance with an estimated amount of stress on the discontinuous outer layer at the location, wherein the location includes a corner of the substrate.

10. The electronic assembly of claim 8, wherein the substrate comprises a glass panel.

11. The electronic assembly of claim 10, further comprising a display configured to display one or more graphical images, wherein the glass panel covers the display.

12. The electronic assembly of claim 8, further comprising a functional layer positioned between the flexible layer and the substrate.

13. The electronic assembly of claim 8, wherein the panels respectively define one or more chamfered edges.

14. The electronic assembly of claim 8, further comprising a discontinuous intermediate layer comprising a second plurality of panels separated by a second plurality of gaps, the discontinuous intermediate layer being positioned between the discontinuous outer layer and the substrate.

15. The electronic assembly of claim 14, wherein the flexible layer at least partially surrounds the discontinuous intermediate layer.

16. A method for forming a protective film on a substrate, the method comprising:
    applying an adhesive layer to the substrate;
    coupling a flexible layer to the adhesive layer; and
    coupling a discontinuous outer layer to the flexible layer, the discontinuous outer layer comprising a plurality of panels separated by a plurality of gaps, wherein the discontinuous outer layer, the flexible layer, and the adhesive layer are transparent.

17. The method of claim 16, wherein coupling the discontinuous outer layer to the flexible layer comprises applying a continuous outer layer and removing a portion of the continuous outer layer to define the gaps.

18. The method of claim 17, wherein removing the portion of the continuous outer layer to define the gaps comprises laser ablating and/or etching the continuous outer layer.

19. The method of claim 16, wherein coupling the discontinuous outer layer to the flexible layer comprises depositing a material at a plurality of discrete locations on the flexible layer.

20. The method of claim 19, wherein depositing the material comprises ion beam assisted deposition and/or physical vapor deposition.

* * * * *